United States Patent
Kulawiec et al.

(10) Patent No.: US 7,268,889 B2
(45) Date of Patent: Sep. 11, 2007

(54) PHASE-RESOLVED MEASUREMENT FOR FREQUENCY-SHIFTING INTERFEROMETRY

(75) Inventors: Andrew Kulawiec, Fairport, NY (US);
Joseph C. Marron, Pittsford, NY (US);
Don McClimans, Fairport, NY (US);
Mark J. Tronolone, Fairport, NY (US)

(73) Assignee: Corning Incorporated, Corning, NY (US)

( * ) Notice: Subject to any disclaimer, the term of this patent is extended or adjusted under 35 U.S.C. 154(b) by 420 days.

(21) Appl. No.: 10/946,690

(22) Filed: Sep. 22, 2004

(65) Prior Publication Data

US 2006/0061772 A1   Mar. 23, 2006

(51) Int. Cl.
*G01B 9/02* (2006.01)
(52) U.S. Cl. ..................................................... 356/511
(58) Field of Classification Search ........ 356/511–516, 356/489, 495
See application file for complete search history.

(56) References Cited

U.S. PATENT DOCUMENTS

| | | | |
|---|---|---|---|
| 4,594,003 A | 6/1986 | Sommargren | 356/359 |
| 4,832,489 A | 5/1989 | Wyant et al. | 356/359 |
| 5,371,587 A | 12/1994 | De Groot et al. | 356/349 |
| 5,473,434 A | 12/1995 | Deck | 356/512 |
| 5,488,477 A | 1/1996 | de Groot | 356/359 |
| 5,502,566 A | 3/1996 | Ai et al. | 356/359 |
| 5,907,404 A * | 5/1999 | Marron et al. | 356/489 |
| 5,926,277 A | 7/1999 | Marron et al. | 356/360 |
| 6,006,128 A | 12/1999 | Izatt et al. | 600/476 |
| 6,028,670 A | 2/2000 | Deck | 356/359 |
| 6,359,692 B1 | 3/2002 | Groot | 356/312 |
| 6,882,432 B2 | 4/2005 | Deck | 356/512 |
| 6,924,898 B2 | 8/2005 | Deck | 356/512 |
| 2003/0160968 A1 | 8/2003 | Deck | 356/515 |
| 2003/0164951 A1 | 9/2003 | Deck | 356/519 |

* cited by examiner

*Primary Examiner*—Hwa (Andrew) Lee
(74) *Attorney, Agent, or Firm*—Timothy M. Schaeberle

(57) ABSTRACT

A frequency-shifting interferometer gathers intensity data from a set of interference patterns produced at different measuring beam frequencies. A periodic function is matched to the intensity data gathered from the set of interference patterns over a corresponding range of measuring beam frequencies. Localized correlations involving phase offsets between the interfering portions of the measuring beam are used to inform a determination of a rate of phase change with measuring beam frequency corresponding to the optical path length difference between the interfering beam portions.

42 Claims, 4 Drawing Sheets

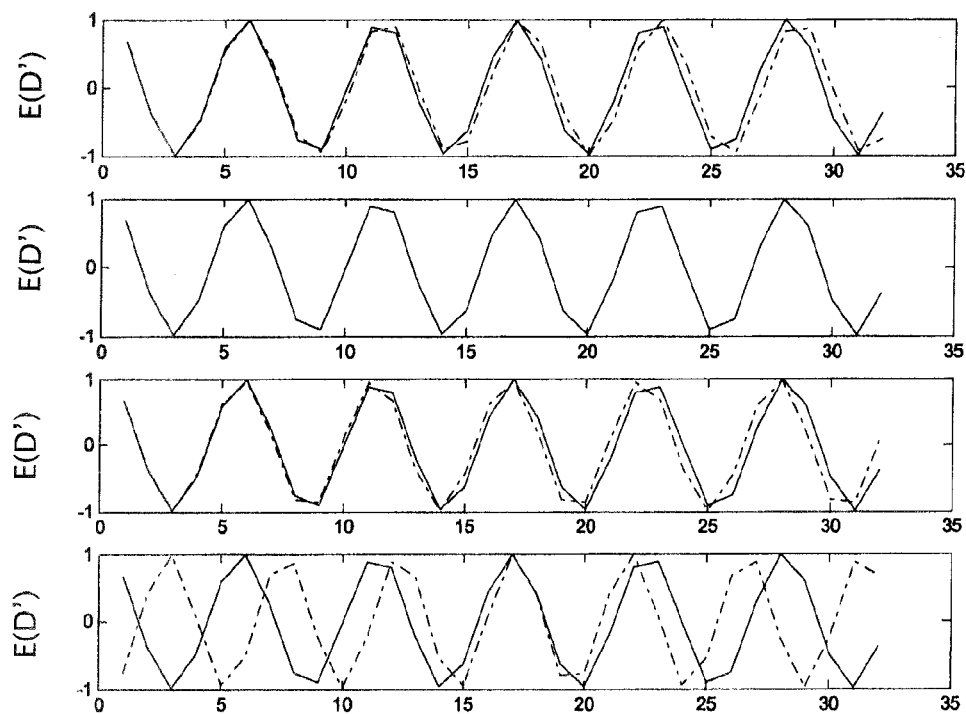
Beam Frequency Increments
FIG. 5A
FIG. 5B
FIG. 5C
FIG. 5D
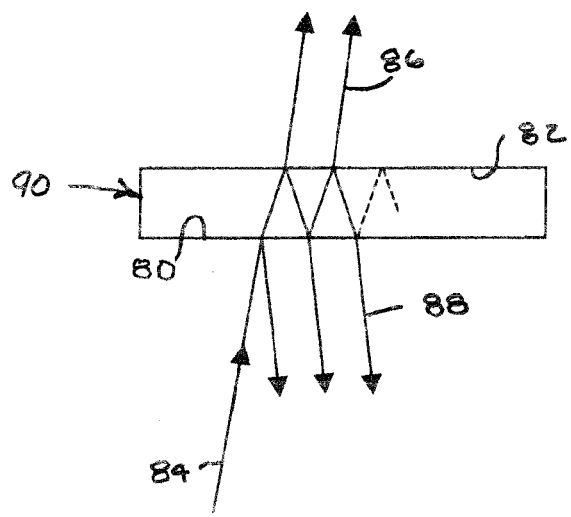
FIG. 6

PHASE-RESOLVED MEASUREMENT FOR FREQUENCY-SHIFTING INTERFEROMETRY

BACKGROUND OF THE INVENTION

1. Field of the Invention

The invention relates to frequency-shifting interferometry in which interferometric data is gathered at multiple measuring beam frequencies and to processing methods for exploiting relationships apparent from resulting interference patterns generated at the multiple measuring beam frequencies for measuring optical path length differences between interfering portions of the measuring beams.

2. Description of Related Art

Pixel intensities within interference fringe patterns produced by interfering beams vary in an orderly manner as a result of progressive changes in either optical path length difference between the measuring beams or measuring beam frequency. The pixel intensities progressively vary through cycles of constructive and destructive interference corresponding to modulo $2\pi$ phase differences between the interfering beams.

Conventional phase-shifting interferometry, such as used for measuring surface height variations on a test surface illuminated at a single measuring beam frequency, exploits this behavior for converting pixel intensity variations within an interference pattern into measures of the surface height variations. Pixel intensity data is first converted into measures of phase differences between interfering beams using a technique known as "phase shifting", which incrementally varies the optical path length difference between test and reference beams. The optical path length difference between test and reference beams is incrementally varied over approximately one $2\pi$ cycle of phase variation so the accompanying changes in intensity can be fit to a periodic function having angular phase values. Since a single $2\pi$ cycle of phase change corresponds to an optical path length difference of one wavelength of the measuring beam, the angular phase measures as fractions of $2\pi$ can be converted directly into measures of height variation. Under measuring conditions of reflection at normal incidence to test surfaces, any different optical path length traveled by the test beam is folded in half, so the measured height variations are equal to one-half of the optical path length differences measured between the pixels of the interference pattern.

However, any particular phase associated with a single $2\pi$ cycle of optical path length difference between measuring beams looks the same (i.e., has the same relative intensity) at each additional multiple of $2\pi$ cycles of phase difference. The intensity data from interference patterns is evaluated as modulo $2\pi$ functions having an ambiguity interval equal to the wavelength of the measuring beam. For example, a phase difference of $\pi$ is indistinguishable from phase differences of $3\pi$, $5\pi$, $7\pi$, and so on. Unless assumptions can be made about the rate of change of measured surfaces, height variations that differ by multiples of one-half of the measuring beam wavelength are indistinguishable as measures of phase. Generally, only smooth surfaces that vary gradually in height with respect to a reference surface can be unambiguously measured. However, the surfaces that can be measured are measured to very high accuracy, i.e., to fractions of one-half the measuring beam wavelength. Since the typical measuring beam wavelength is less than one micron, measurements in the tens of nanometers can be made.

Frequency-shifting interferometry (also known as multi-wavelength interferometry) exploits the orderly variation of pixel intensity with changes in measuring beam frequency. A succession of interference patterns are captured, each formed at a different measuring beam frequency. The rate of phase change with respect to the change in measuring beam frequency can be equated to the optical path length difference between the interfering measuring beams. The intensity data of individual pixels is collected at incrementally varying beam frequencies to identify a frequency of phase change that best matches the intensity data. A Fourier transform is typically used for this purpose. The frequency of phase change can be directly related to an optical path length difference within an ambiguity interval that is a function of the size of the incremental variation in measuring beam frequency as follows:

$$\text{Ambiguity Interval} = \frac{c}{\Delta v_{INCREMENT}} \quad (1)$$

where c is the speed of light and $\Delta v_{INCREMENT}$ is the spacing between measuring beam frequencies. Thus, the smaller the increment, the larger the ambiguity interval. For example, 300 GHz increments produce an ambiguity interval of approximately one millimeter, which is 1000 times larger than a nominal measuring beam wavelength of about one micron.

The accuracy with which the frequency of phase change can be measured is related to the total range of measuring beam frequencies, which range is equal to the incremental variation in measuring beam frequency $\Delta v_{INCREMENT}$ times the number N of measuring beam frequencies that are used for the measurement. The following expression gives the full width half maximum (FWHM) of the Fourier frequency peak closest to the frequency of phase change that best matches the intensity data.

$$\text{Peak Width} = \frac{c}{N \Delta v_{INCREMENT}} \quad (2)$$

Thus, the accuracy of the measurement relates to a division of the ambiguity interval by the number N of measuring beam frequencies. For measurements involving 30 measuring beam frequencies at increments of 300 GHz, Fourier frequency peak widths of a little more than three microns result. Although further processing of the Fourier peaks, such as by interpolating between neighboring Fourier peaks, can increase the accuracy of the measurement, the expected accuracies are still not nearly as good as the accuracies typical of phase-shifting interferometry.

Frequency-shifting interferometry is particularly useful for measuring surfaces exhibiting height variations well beyond the nominal wavelength of the measuring beam. Height variations between adjacent pixels of more than one-half wavelength (upon reflection) cannot be unambiguously resolved by conventional phase-shifting interferometric techniques because the individual pixels exhibit the same relative intensities at height intervals of one-half wavelength (i.e., corresponding to one full wavelength of optical path difference between test and reference beams). However, by sampling the intensities of individual pixels at predetermined intervals of measuring beam frequency, height measurements can be made on a much larger scale. In general, the closer the measuring beam frequencies are together, the larger the range of unambiguous measurement, and the larger the span of measuring beam frequencies the finer the resolution of the measurement.

Although frequency-shifting interferometry accommodates a much larger range of height variations, the accuracy with which the measurements are made tends to be limited. Each measurement taken at a different measuring beam frequency adds to both the time for taking the measurements and the time for calculating a result. The number of measurements (i.e., the number of different measuring beam frequencies) is limited at a point where the increased measurement and processing time cannot be justified for achieving the corresponding incremental increase in accuracy. Measurement speed is especially important when the manufacture of parts is interrupted for taking in-process measurements.

BRIEF SUMMARY OF THE INVENTION

The invention in one or more of its preferred embodiments achieves accuracies equivalent to those of conventional phase-shifting interferometry over measurement ranges (ambiguity intervals) typical of frequency-shifting interferometry or beyond. Rough surfaces and surfaces with discontinuities exceeding one wavelength of optical path length difference between interfering measuring beam portions can be unambiguously measured to accuracies normally limited to much smoother surfaces.

The invention is based in part on an appreciation that intensity variations undergone by individual pixels within an interference pattern as a result of changes in measuring beam frequency reflect both a unique phase at each different measuring beam frequency and a unique frequency of phase change with measuring beam frequency. A periodic function can be fit to the intensity data gathered for each pixel for converting the intensity data into individual phases that are linked to particular measuring beam frequencies and that exhibit a unique frequency of phase change with measuring beam frequency. Both the individual phases and the frequency of phase change provide measures of the optical path length difference between interfering portions of the measuring beam.

A comparison of the measured phases between pixels considered at a nominal measuring beam wavelength is referred to as a measure of phase offset, which varies unambiguously within a narrow range optical path length differences corresponding to the nominal wavelength of the measuring beam. However, the frequency of phase change varies unambiguously within a wider range of optical path length differences up to the absolute optical path length difference between the interfering measuring beams. Together, the determination of the phase offset and the frequency of phase change provide for measuring distances to accuracies corresponding to those of phase-shifting interferometers over distance ranges typical of frequency-shifting interferometers or beyond.

Intensity data can be gathered in the usual ways for frequency-shifting interferometry, such as by recording interference patterns produced between test and reference surfaces at different measuring beam frequencies. The intensity data can be arranged in sets corresponding to the intensity changes undergone by individual pixels within the interference patterns. Fitting a periodic function to the intensity data sets accomplishes two different purposes. First, the periodic function collectively fits the intensity data to individual angular measures of phase, achieving a result similar to phase-shifting interferometry. Second, the periodic function fits the intensity data to a frequency of phase change, achieving a result similar to frequency-shifting interferometry. The fit to phase can be used to inform the fit to frequency by limiting the frequency choices to those that also satisfy the fit to phase.

For measuring height variations over a test surface, both the test surface and a reference surface can be illuminated by different, preferably intensity balanced, portions of a measuring beam. The illuminated test and reference surfaces can be imaged onto a detector array containing individual pixels that sense a predetermined range of local intensities. Interference between the test and reference beams produces intensity variations among the individual pixels corresponding to modulo $2\pi$ phase offsets between the test and reference beams. A modulo $2\pi$ phase offset of zero produces a maximum intensity (i.e., the different portions of the measuring beam interfere constructively), and a modulo $2\pi$ phase offset of $\pi$ produces a minimum intensity (i.e., the different portions of the measuring beam interfere destructively).

The optical path length differences among neighboring pixels of rough or discontinuous surfaces can vary so abruptly that no discernable fringes are evident in the interference patterns, rendering conventional phase unwrapping techniques for relating the height of one pixel to another unusable. Although conventional phase-shifting techniques could be used to convert the intensity data back into modulo $2\pi$ phase offsets, comparisons between neighboring pixels would remain ambiguous because the phase offsets between neighboring pixels may exceed $2\pi$.

However, drawing from frequency-shifting interferometry, a plurality of different interference patterns can be produced, differing as a result of changes in the measuring beam frequency. Each of the pixels corresponding to a single location on the test surface can be associated with a set of intensity-related values paired with the beam frequencies at which they are produced. One version of the invention compares the set of intensity-related values associated with an individual pixel to a periodic function that varies in phase offset and in frequency of phase change as a function of optical path length differences between the interfering portions of the measuring beam. One or more optical path length differences can be identified at which a correlation of the periodic function to the intensity-related values undergoes a localized peak that matches a phase offset predicted by the periodic function to a pattern of the intensity-related values. An optical path length difference can be identified from among the one or more localized peaks at which the correlation of the periodic function to the intensity-related values undergoes a generalized peak that matches a frequency of phase change predicted by the periodic function to the pattern of intensity-related values.

The periodic function can be expressed as an expected pattern of normalized intensity values fluctuating over a domain of measuring beam frequencies based on the phase offset and the frequency of phase change associated with a given optical path length difference between the interfering portions of the measuring beam. A correlation of the periodic function to the pixel intensity data sets can be made by comparing the pixel intensity values (albeit preferably normalized) within each of the data sets to the expected intensity values of the periodic function at corresponding measuring beam frequencies.

At a given optical path length difference, the periodic function predicts a particular phase represented as a normalized intensity value for each measuring beam frequency as well as a unique frequency of phase change represented by the same normalized intensity values at their associated measuring beam frequencies. By sampling different optical path length differences, the correlation of the periodic function to the pixel intensity values can be converged toward one or more localized peaks at which the predicted phases of the periodic function, also referred to as the phase offset, provide a collective match with the distribution of the pixel intensity values. That is, in the vicinity of any one frequency of phase change, there is an optical path length difference at which the phase offset best matches the pixel intensity values. These localized peaks are spaced apart by optical path length differences equal to the nominal wavelength of the measuring beam. Thus, the localized peaks provide a modulo $2\pi$ measure of the optical path length difference within an ambiguity interval equal to the nominal wavelength of the measuring beam comparable to conventional phase shifting.

The periodic function also supports a further measure of correlation among the localized peaks within a generalized peak that matches the predicted frequency of phase change to the same pixel intensity values. While some phase offsets match better than others in the vicinity of a given frequency of phase change, the matching phase offsets at the localized peaks match even better as the frequency of phase change also matches the pixel intensity values at the generalized peak. For example, at the localized peaks, one or more of the pixel intensity values may closely match the intensities of the periodic function predicted for a given phase offset while other of the pixel intensity values may depart by equally balanced amounts from the intensities predicted by the periodic function. At the generalized peak, all or nearly all of the pixel intensity values closely match the predicted intensity values of the periodic function. Thus, the localized peaks occur at optical path length differences where any remaining error in the frequency of phase change expressed as errors in phase are equally balanced among the pixel intensity values, and the generalized peak occurs at the optical path length difference where the departures in phase are at a minimum throughout the entire range of pixel intensity values.

Noise and other errors of a random or systematic nature can lower the correlation between the pixel intensity values and the predicted values of the periodic function. However, the pattern of localized peaks within the envelope of the generalized peak can still provide a good estimate of the optical path length differences among the different pixels of the interference patterns. Care is preferably taken for determining the measuring beam frequencies at which the pixel intensity data is gathered, so that high correlations can be made with the predicted values calculated at the same measuring beam frequencies.

Since the phase offset between the interfering portions of the measuring beam varies as a result of changes in the measuring beam frequency, uncertainty of the measuring beam frequency also results in a corresponding uncertainty over the optical path length difference indicated by the pixel intensity values. The measuring beam uncertainties include uncertainty over the nominal measuring beam frequency, uncertainty over the range of different measuring beam frequencies, and uncertainties over the spacing between the measuring beam frequencies.

Preferably, the nominal measuring beam frequency is measured or otherwise determined and the changes to the nominal measuring beam frequency are also measured or otherwise determined. For example, as disclosed in co-assigned US Application entitled OPTICAL FEEDBACK FROM MODE-SELECTIVE TUNER also filed on even date herewith, one or more measuring cavities of known dimensions can be used for determining the measuring beam frequency simultaneously with the recordation of the interference patterns. Comparisons can also be made between the measuring beam and a reference beam having a known beam frequency. Errors in the nominal beam frequency assumed for the periodic function can appear as an offset of the localized correlation peaks under the generalized correlation peak. Adjustments can be made to the nominal beam frequency of the periodic function to more closely match the peak correlation of phase offset with the peak correlation of the frequency of phase change over one or more pixel intensity data sets.

Although for purposes of fitting the periodic function to the pixel intensity data sets, the measuring beam frequencies, if otherwise known, can be unevenly spaced, approximations of the surface height variations among the pixels can be made more readily by equally spaced measuring beam frequencies. Conventional Fourier transforms can be used to initially process the pixel intensity data sets to approximate the optical path length differences to within the generalized correlation envelope of the periodic function. The interim approximations can save processing time and serve other purposes such as distinguishing different measuring regions of the test surfaces.

However, for purposes of both improving accuracy and expanding the range of unambiguous measurement, the measuring beam frequencies can be unequally spaced, which is referred to as chirping. More closely spacing some of the measuring beam frequencies contributes to expanding the range of measurement, and more distantly spacing other of the measuring beam frequencies for enlarging the overall range of measuring beam frequencies contributes to raising the accuracy of measurement or to loosening tolerances for achieving desired accuracies.

BRIEF DESCRIPTION OF THE SEVERAL VIEWS OF THE DRAWING(S)

FIGS. 5A-5D are plots comparing a normalized intensity pattern of the particular distance to the predicted intensity patterns of other distances FIG. 6 is a diagram showing the multiple reflections from the cavity of a single-arm interferometer that can be used in the practice of the invention.

DETAILED DESCRIPTION OF THE INVENTION

Figure 1:
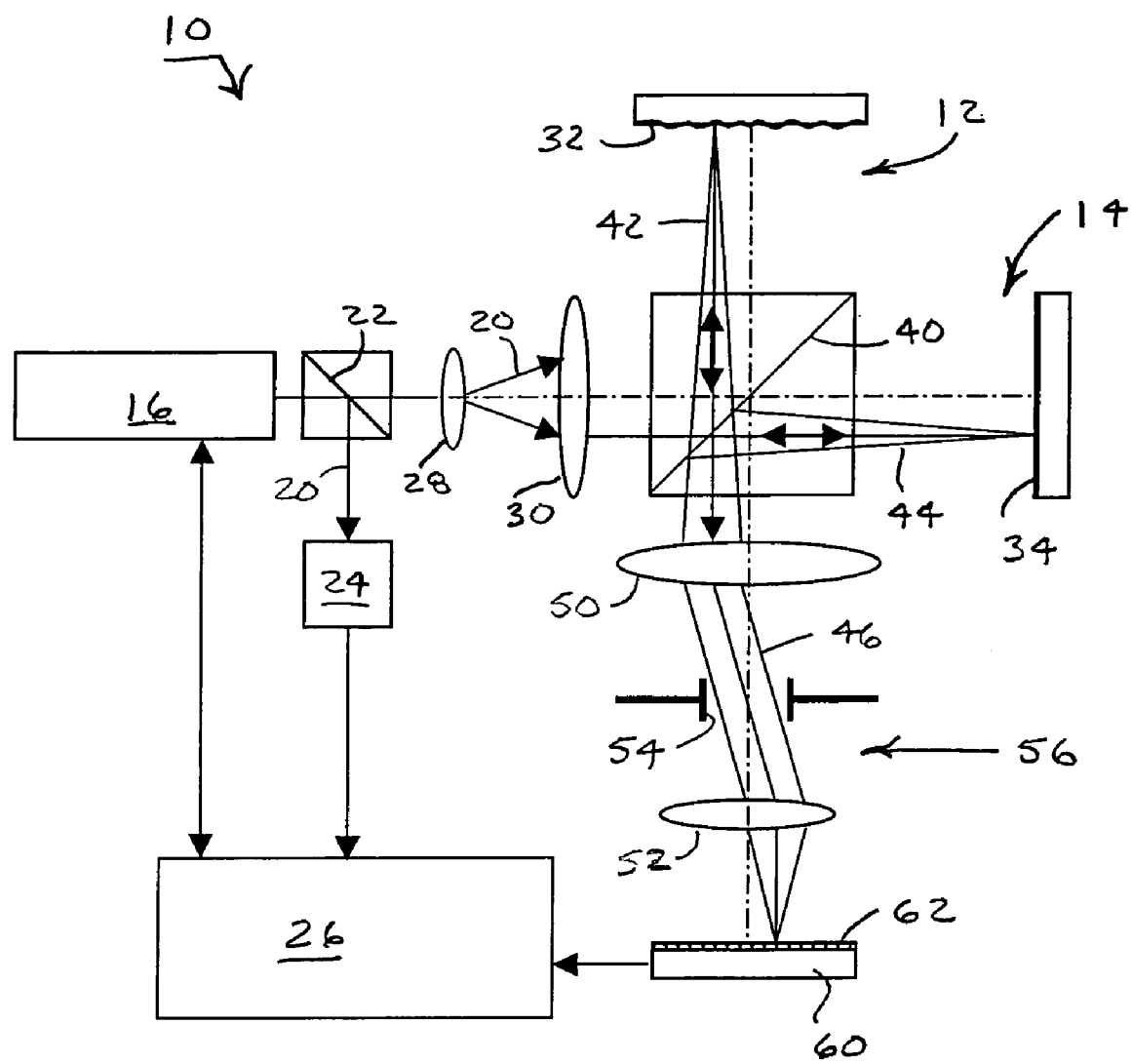
FIG. 1 is a diagram of a frequency-shifting interferometer arranged in accordance with the invention for measuring height variations of a test surface.

An image-based frequency-shifting interferometer 10 arranged in accordance with the invention is depicted in the configuration of a Michelson interferometer having separate test and reference arms 12 and 14. Other interferometer configurations including common test and reference arm configurations, such as a Fizeau interferometer, can also be used in the practice of the invention. Such interferometers preferably have the capability of producing and processing multiple interference patterns at different measuring beam frequencies.

For example, the illustrated interferometer 10 includes a frequency tunable laser 16 that emits a measuring beam 20 having a frequency that is adjustable through a range of discrete frequencies. A beamsplitter 22, which preferably has the form of a partial reflector, diverts a small percentage of the measuring beam 20 to a frequency analyzer 24. The measuring beam frequency is measured by the frequency analyzer 24, and the frequency information is passed to a computer 26, which can store the frequency information for performing future calculations or can generate a feedback signal for further tuning the laser 16 to a desired frequency.

The frequency analyzer 24 can itself take the form of an interferometer, such as a common path interferometer having reference surfaces arranged as an etalon or cavity for detecting changes in beam frequency. At a fixed spacing between the reference surfaces, changes in the measuring beam frequency produce corresponding changes in interference between different portions of the measuring beam encountering the reference surfaces. The interference changes can be interpreted as changes in the measuring beam frequency.

A separate reference beam having a known frequency for comparison or a combination of etalons or cavities can be used to determine the absolute value of the measuring beam frequency. Although the frequency analyzer 24 is preferably positioned close to the tunable laser 16, which is typically a more controlled environment, the measuring beam 20 can be sampled elsewhere along its length, except where such sampling would have a deleterious effect on the intended measurements made by the interferometer 10.

A preferred frequency tunable laser for the practice of the invention is disclosed in US Application entitled MODE-SELECTIVE FREQUENCY TUNING SYSTEM filed on even date herewith. A preferred frequency analyzer for the practice of the invention is disclosed in US Application entitled OPTICAL FEEDBACK FROM MODE-SELECTIVE TUNER also filed on even date herewith. Both co-filed applications are hereby incorporated by reference.

A beam expander 28 and a collimator 30 reshape the measuring beam 20 for illuminating both a test surface 32 and a reference surface 34 at normal incidence. Other angles of incidence including grazing angles could also be used, such as for purposes of increasing reflectivity or filtering surface variations. Diffuse test and reference surfaces 32 and 34 could be illuminated with uncollimated (e.g., diverging) beams as disclosed in co-pending U.S. application Ser. No. 10/610,235, entitled FREQUENCY-SCANNING INTERFEROMETER WITH NON-SPECULAR REFERENCE SURFACE, which is hereby incorporated by reference.

A beamsplitter 40 divides the measuring beam 20 into a test beam component 42 and a reference beam component 44 that reflect, respectively, from the test surface 32 and the reference surface 34 back to the beamsplitter 40. The beamsplitter 40 also recombines the reflected test and reference beam components 42 and 44 into a modified measuring beam 46 that is encoded with information concerning differences between the test and reference surfaces 32 and 34. For preserving light, the beamsplitter 40 can be arranged as a polarizing beamsplitter that is used in conjunction with quarter-wave retarders (not shown) along the test and reference arms 12 and 14 for managing the directions of light travel through the beamsplitter 40.

Imaging components 50 and 52 together with an aperture stop 54 form a telecentric imaging system 56 for imaging the test and reference surfaces 32 and 34 onto a detector 60, which incorporates an array of pixels 62 for sensing local intensities throughout the field of view. While a telecentric imaging system, such as the illustrated telecentric imaging system 56, is preferable, particularly for minimizing perspective errors of imaged surface features, other imaging and illumination optics can be used for other purposes consistent with known practices in the art. Adjustments to the beamsplitter 40 or other optics that act separately on the test and reference beam components 42 and 44 can be used to balance the overall intensities of the recombined test and reference beam components 42 and 44 for optimizing interference contrast at the detector 60.

The computer 26 is preferably arranged in connection with the detector 60, such as by incorporating a frame grabber, to record interference patterns imaged onto the detector 60 at each of a plurality of different measuring beam frequencies. Intensity data from each pixel is preferably arranged in a set and referenced (e.g., by virtue of its order) to the measuring beam frequency at which it was produced. The data set for each pixel contains interference information relating to modulo $2\pi$ phase offsets between the test and reference beam components 42 and 44 from respective finite areas of the test and reference surfaces 32 and 34 that are imaged onto individual pixels of the detector pixel array 62.

Information concerning the measuring beam frequencies to which the intensity data is referenced can be acquired from the frequency analyzer 24, other measuring sources, or from predetermined target values. Conventional frequency-shifting interferometric practices favor equally spaced measuring beam frequencies, allowing for aliased processing of data without precise knowledge of the actual frequencies of the measuring beam. However, information concerning the actual measuring beam frequencies permits the use of uneven spacing between the measuring beam frequencies to increase the accuracy and range of measurement made in accordance with the invention. For example, wider spaced measuring beam frequencies can be used in combination with more closely spaced measuring beam frequencies to improve accuracy or loosen other tolerances without requiring additional measuring beam frequencies or sacrificing the range of measurement.

An intensity signal l(υ) for a pixel in the detector pixel array 62 can be written as the interference of the reference beam component $U_{REF}$ and the test beam component $U_{TEST}$ as follows:

$$I(\upsilon)=|(U_{REF}+U_{TEST})|^2, \quad (3)$$

where the signal l(υ) is recorded as a function of the measuring beam frequency υ.

The reference beam component $U_{REF}$ can further be written as:

$$U_{REF} = \sqrt{I_{REF}} \exp\left(i\frac{4\pi}{c}D_{REF}\upsilon\right), \quad (4)$$

where $l_{REF}$ is the intensity of the reference beam component 44, c is the speed of light, $D_{REF}$ is the optical distance from the laser source 16 to the reference surface 34, and υ is the laser frequency.

Similarly, the test beam component $U_{TEST}$ is given by:

$$U_{TEST} = \sqrt{I_{TEST}} \exp\left(i\frac{4\pi}{c} D_{TEST} v\right). \quad (5)$$

where $I_{TEST}$ is the intensity of the test beam component 42 and $D_{TEST}$ is the optical distance from the laser source 16 to the test surface 32.

By substitution into Equation (3) we then have:

$$I(v) = I_{REF} + I_{TEST} + 2\sqrt{I_{REF} I_{TEST}} \cos\left(\frac{4\pi}{c} Dv\right), \quad (6)$$

where distance $D = D_{REF} - D_{TEST}$. Since the test and reference beam components 42 and 44 are folded along their respective test and reference arms 12 and 14, the distance D is equal to one-half of the optical path length difference between the test and reference beam components 42 and 44.

Equation (6) forms the basis for measurement using a frequency-shifting interferometer, such as the interferometer 10. The basic task is to determine the value of distance D that gives rise to the series of intensity measurements at the sampled measuring beam frequencies.

In a simplified discrete notation of Equation (6), the expected intensity $I'_n$ with bias subtracted and magnitude normalized to one is given as follows:

$$I'_n = \cos\left(\frac{4\pi}{c} D v_n\right) \quad (7)$$

where $I'_n$ is the expected intensity value at a pixel recorded at the $n^{th}$ measuring beam frequency and $v_n$ is the $n^{th}$ measuring beam frequency value.

Figure 2:
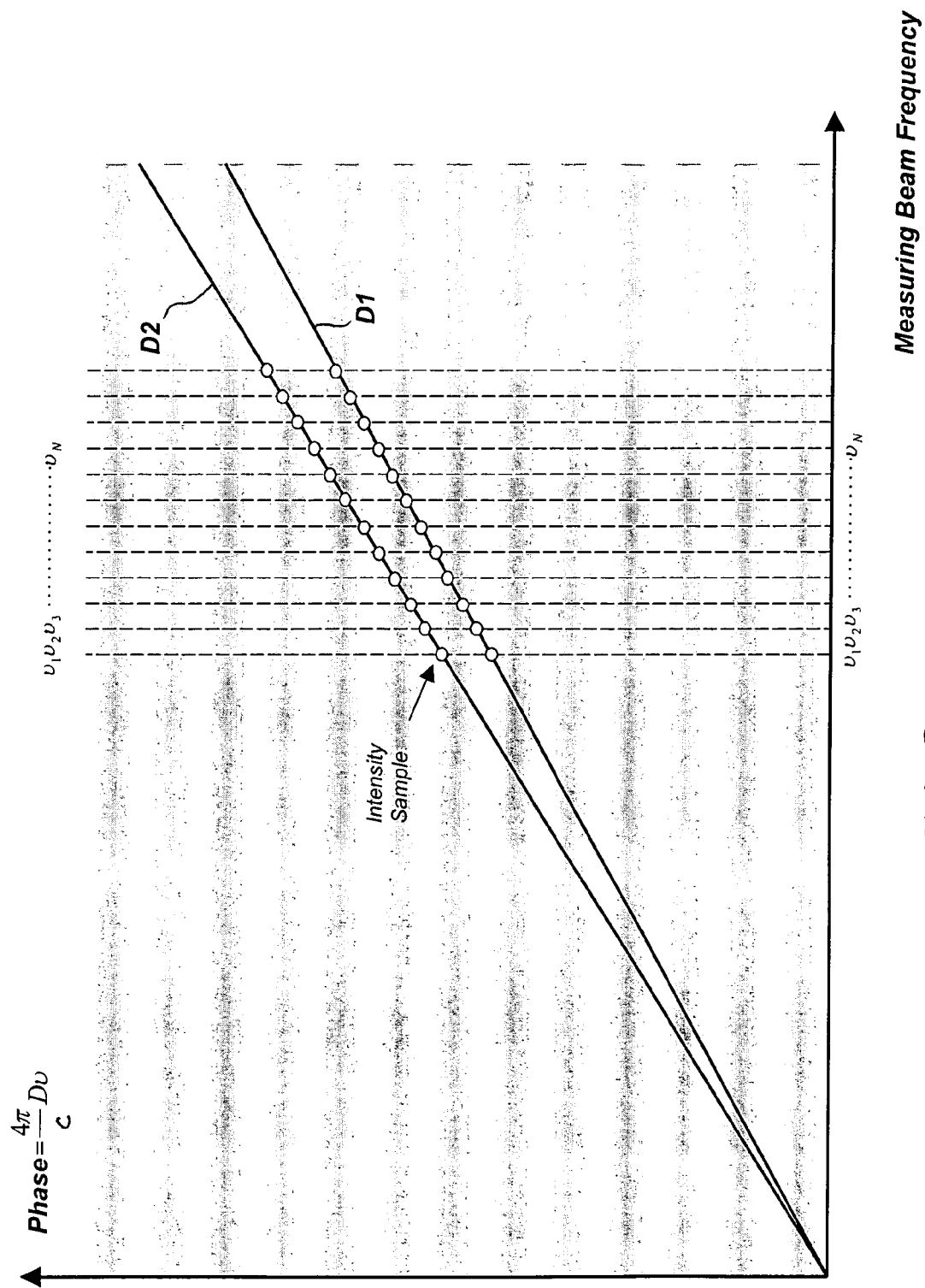
FIG. 2 is a plot of two different distances as lines on a graph of pixel intensity variation (phase) over domain of measuring beam frequencies.

An exaggerated illustration of the expected intensity patterns of two different distances D1 and D2 appears in the graph of FIG. 2. A range of intensity values $I'_n$ as corresponding measures of their phase component $\arccos(I'_n)$ are plotted over a domain of measuring beam frequencies. Distances D1 and D2 appear as straight lines that extend from the origin and are distinguished by slopes representing their rate of change in phase over a common domain of measuring beam frequencies.

As the measuring beam frequency changes, the phases of the two distances D1 and D2 shift through cycles of constructive and destructive interference. The rate of phase shift varies between distances D1 and D2 because of their differing slopes. Along the beam frequency domain (i.e., the abscissa), a span of frequencies equal to the quotient of the speed of light divided by twice the distance D (i.e., c/2D) is associated with each complete $2\pi$ cycle of phase change for a given distance D. Along the phase domain, one complete $2\pi$ cycle of interference corresponds to a change of distance D equal to one-half of the measuring beam wavelength at the considered measuring beam frequency. That is, the distance change at any one measuring beam frequency required to produce a complete $2\pi$ cycle of phase change is equal to one-half of the measuring beam wavelength as expected for conventional phase-shifting interferometry.

As the measuring beam frequency increases, the change in slope corresponding to a complete $2\pi$ cycle of phase change decreases. Measuring beam frequencies of over 300,000 GHz are expected for taking measurements within the visible spectrum. At a given measuring beam frequency, the phase difference between two closely spaced distances is much more pronounced than the slope difference between the same distances. Accordingly, the phase offset, which corresponds to the phase difference between two distances considered at a nominal measuring beam frequency, changes much more rapidly than the frequency of phase change with measuring beam frequency, which corresponds to the slopes of the two distances. However, the phase offset has a limited ambiguity interval, whereas the slope for practical purposes does not. Distances separated by increments of one-half the nominal measuring beam wavelength match the intensity/phase pattern of a given distance D much better than other distances for which the phase offset varies by other than $2\pi$ amounts.

Thus, both the phase offset and the frequency of phase change provide measures of distance D. The phase offset is much more pronounced in the vicinity of the actual distance D but has a small ambiguity interval equal to one-half of the nominal measuring beam wavelength. However, phase offset limits the choices of possible distances D to a distance spacing at which a comparison of the frequencies of phase change (i.e., slopes) can be made more effectively.

For example, the measurement of distance D can be accomplished by determining the value of D' that results in the best match between modeled data and the measured data. For a least-squares formulation, the following metric can be used to evaluate the match:

$$\varepsilon(D') = \sum_{n=1}^{N} \left[I_n - \cos\left(\frac{4\pi}{c} D' v_n\right)\right]^2 \quad (8)$$

where $\varepsilon(D')$ is the value of the error metric at a trial distance D', $I_n$ is the normalized intensity value at a pixel recorded at the $n^{th}$ measuring beam frequency (i.e., the measured data), and the summation is taken over the N measuring beam frequencies. A data set for $I_n$, where n ranges from 1 through N, corresponds to a set of normalized intensity values for a single pixel referenced to the measuring beam frequency $v_n$ at which the intensity values are produced.

Following the least squares method, the error is minimized at a location where the derivative of $\varepsilon$ with respect to D' is equal to zero. The derivative is $$\frac{\partial \varepsilon(D')}{\partial D'} = -\sum_{n=1}^{N} \frac{8\pi v_n}{c} I_n \sin\left(\frac{4\pi}{c} D' v_n\right) + \sum_{n=1}^{N} \frac{4\pi v_n}{c} \sin\left(\frac{8\pi}{c} D' v_n\right). \quad (9)$$

Because the last term does not depend on the data, we can ignore it, leading to the following metric:

$$\varepsilon'(D') = \sum_{n=1}^{N} v_n I_n \sin\left(\frac{4\pi}{c} D' v_n\right). \quad (10)$$

To further simplify Equation (10), it may be noted that in the optical frequency regime (i.e., more than 300,000 GHz), the values of $v_n$ vary only slightly over the typical tuning bandwidth, and thus, the $v_n$ term immediately to the right of the summation can be ignored.

By finding the value of D' that minimizes $\epsilon$ in Equation (10), a solution for D' can be obtained that matches both the phase offset and the frequency of phase change with the measuring beam frequency. The approach also allows for variation in the sampling of measuring beam frequencies, including unequally spaced frequency samples. So long as the values of $\upsilon_n$ are known, the values can be distributed as desired for achieving specific goals, including accuracy, repeatability, time, and cost.

Equation (10) also shows that other metrics are possible. For example, rather than minimizing the sine transform, one could maximize the cosine transform as follows:

$$\varepsilon''(D') = \sum_{n=1}^{N} I_n \cos\left(\frac{4\pi}{c} D' v_n\right), \quad (11)$$

which is equivalent to the real part of a Fourier transform.

Implementation of the least-squares method is straightforward. Given a vector of data values, as in Equation (7), and a vector of frequency values, a pre-computed 'matrix of sinusoids' can be constructed for testing to determine the value of D' that maximizes Equation (11).

Normalization can be used to remove unwanted bias from the merit function of Equation (11). The normalized merit function has a value of one when the intensity values correspond perfectly to the cosine term in Equation (11). The normalized merit function is given by:

$$E(D') = \frac{\sum_{n=1}^{N} I_n \cos\left(\frac{4\pi}{c} D' v_n\right)}{\sqrt{\sum_{n=1}^{N} I_n^2} \sqrt{\sum_{n=1}^{N} \cos^2\left(\frac{4\pi}{c} D' v_n\right)}}. \quad (12)$$

An important practical aspect of implementing this algorithm is that the merit function in Equation (12) has fine detail on the order of the wavelength. For example, the phase offsets corresponding to the actual distance D and to other values of D' spaced by intervals of one-half the nominal wavelength of the measuring beam exhibit localized correlation peaks, which can be readily identified.

Figure 3:
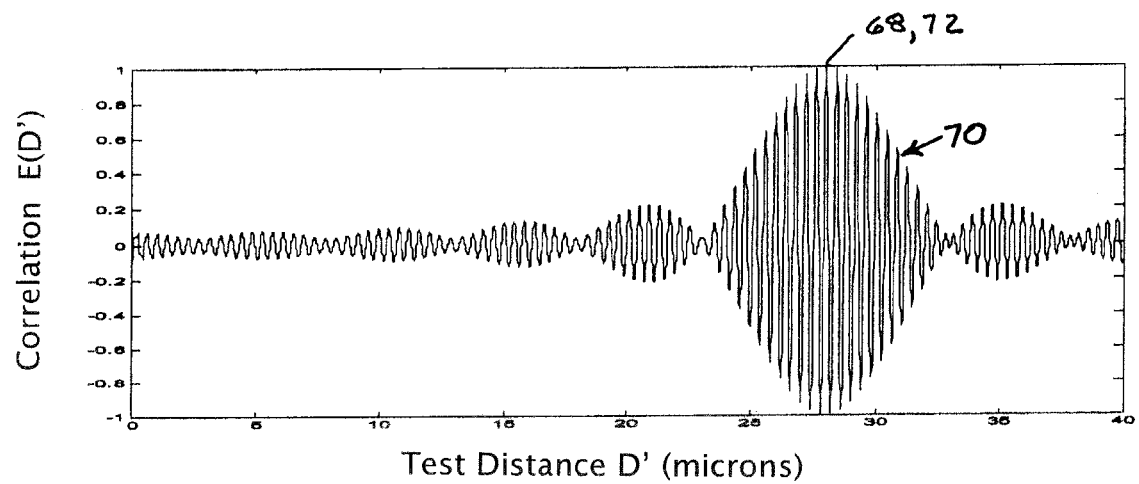
FIG. 3 is a plot illustrating a correlation of a merit function for a particular distance over a domain of different distances.
Figure 4:
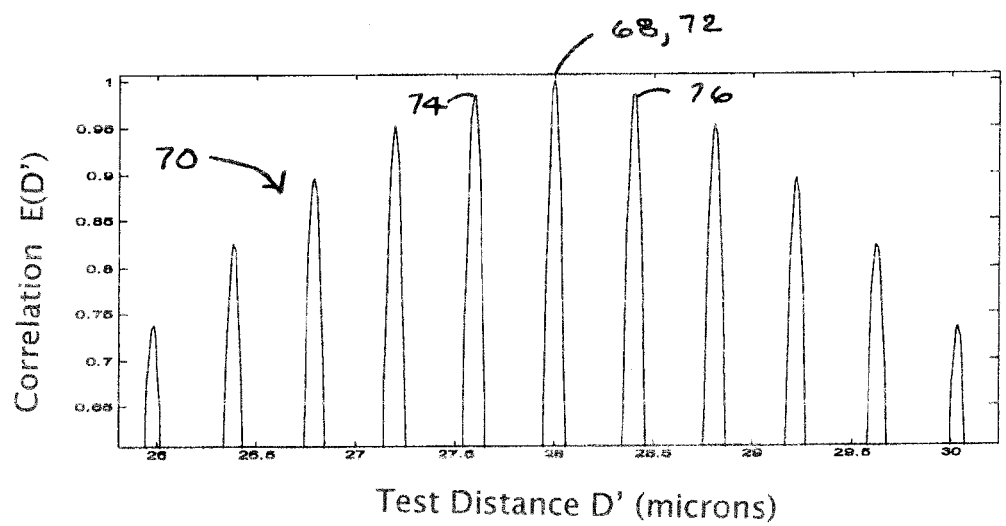
FIG. 4 is an enlargement of a portion of the plot of FIG. 3 in the vicinity of the particular distance.

Practical features of Equation (12) based on input values listed in Table 1 for a pixel distance D of 28 microns are apparent from two plots of Equation (12) presented in FIGS. 3 and 4 at different scales. The resulting normalized merit function of Equation (12) plotted in FIG. 3 shows the variation of correlation among candidate distances D' ranging from 0 to 40 μm. FIG. 4 shows the same merit function for distances from 26 to 30 microns.

The full width half maximum (FWHM) of the main lobe or envelope 70 in the plot of FIG. 3 is a value of 4.88 microns, which corresponds at least approximately to one-half the value given by Equation (2). The value of Equation (2) is halved because the distances D' equal one-half of the optical path length differences between the test and reference beams 42 and 44. Within the main lobe or envelope 70, the merit function has many sharp localized peaks (approximately 12) separated by one-half of the nominal wavelength of the measuring beam of approximately 0.4 microns. The highest localized peak 72 corresponds to the generalized peak 68 of the main lobe 70 of the merit function at the test distance D' equal to 28 microns.

FIGS. 5A-5D show plots of normalized data at the actual distance D of 28 microns (shown in solid line) compared to other test values of D' (shown in broken lines). The actual values correspond to an idealized pixel data set of normalized intensities referenced to the measuring beam wavelengths at which they were acquired. FIG. 5B shows a plot connecting the normalized intensities gathered at 32 evenly spaced increments of measuring beam frequency for the actual distance D of 28 microns. The frequency of phase change with measuring beam frequency is apparent from the sinusoidal form of the plotted intensity variation.

FIG. 5A shows intensity values expected for a test distance D' of one-half the initial wavelength less than 28 microns (approximately 27.6 microns), and FIG. 5C shows intensity values expected for a test distance D' of one-half the initial wavelength more than 28 microns (approximately 28.4 microns). The plots of FIGS. 5A and 5C match the plot of the actual distance D at the initial measuring beam frequency and progressively depart in phase by only small amounts throughout the range of beam frequency measurement. Thus, the test distances D' of FIGS. 5A and 5C correspond at least approximately to localized correlation peaks 74 and 76 straddling the highest localized peak 72. Other lesser test distances D' having a similar frequency of phase shift but departing from the true distance D by one-quarter of the initial wavelength (e.g., 28.2 microns) are offset through a $\pi$ phase shift that results in a correlation trough.

FIG. 5D compares the plot of the actual distance D of 28 microns against a plot of a test distance D' varying by the FWHM peak width of 4.88 microns. A $2\pi$ phase shift occurs between the two plots over the sampled range of measuring beam frequencies. Although the overlying plots match well at one measuring beam frequency near the middle of the beam frequency range (representing a minimum of phase offset), the plots depart by maximum amounts at both ends of the beam frequency range, leading to a greatly reduced correlation. In other words, even at distances corresponding to $2\pi$ phase offsets, correlations drop substantially over large errors in distance, because errors in the frequency of phase change (i.e., errors in slope) become more significant.

Using the correlation merit function of Equation (12), distances D can be determined on a pixel-by-pixel basis without regard to the distances of adjacent pixels. The values of D' are systematically varied until a localized peak correlation is found with the normalized data acquired from an individual pixel. Once a localized correlation peak is found, the number of remaining choices of D' for achieving a higher correlation are limited largely to multiples of one-half of the

TABLE 1

| Initial Frequency | Frequency Increment | Number of Frequencies | Peak Width (FWHM) | Initial Wavelength | Wavelength Increment | Pixel Distance, D |
|---|---|---|---|---|---|---|
| $3.85 \times 10^{14}$ Hz | 960 GHz | 32 | 4.88 μm | 0.779 μm | 1.95 nm | 28 μm | nominal measuring beam wavelength. Accordingly, convergence to the generalized peak 68 (where the frequency of phase change, i.e., the slope of the measured distance D, is also matched) is informed by the phase-offset requirements of the correlation, which contribute to both the speed and accuracy of the convergence.

In a sense, the identification of a localized peak is equivalent to phase shifting. Instead of collecting data at a fixed measuring beam frequency over a small range of distances to collectively reference pixel intensity values to their corresponding phases, the preferred invention collects data at a fixed distance over a small range of measuring beam frequencies to collectively reference pixel intensity values to their corresponding phases. However, unlike conventional phase shifting, the same correlation function that is used for identifying the phase offset can also be used for choosing among distances D' exhibiting the same phase offset for determining the distance D at which the pixel is located relative to a reference surface.

Background knowledge of the test surface shape and position can be used as a starting point for the correlation search, or the pixel data sets can be pre-processed to derive an estimate similar to the procedures used for conventional frequency-shifting interferometry. For example, a conventional Fourier transform or Fast Fourier Transform can be used as a first pass to test the intensity data gathered at discrete measuring beam frequencies. Details regarding the use of Fourier transforms for frequency-shifting interferometry are disclosed in U.S. Pat. No. 6,741,361, entitled MULTI-STAGE DATA PROCESSING FOR FREQUENCY-SCANNING INTERFEROMETER, which is hereby incorporated by reference.

Because the sample frequencies of the Fourier transform (corresponding to slopes of phase change with respect to measuring beam frequency) are spaced apart, the intensity data points tend to fit imperfectly into the sample Fourier frequencies (referred to as bins) to varying degrees. Conventional routines can be used to interpolate between the highest amplitudes of the sampled Fourier frequencies by assuming a parabolic shape for the amplitudes in the vicinity of the peak frequency. A "moment arm" technique preferred for this purpose, which weighs the resulting sample Fourier frequency amplitudes over a greater range of sampled Fourier frequencies to find the peak Fourier frequency. Conventional windowing techniques can be used where the data exists over a limited range that may not be otherwise continuously repeatable.

The identified Fourier frequency can be converted into a test distance D' as a starting point for the iterative curve fitting procedure embodied in the merit function of Equation (12). Preferably, the test distance D' falls within the main lobe or envelope 70 of the merit function to provide a timesaving starting point for exercising the merit function. In some instances, merely distinguishing between the Fourier frequencies may be enough to achieve this level of accuracy; but in other instances, the finer interpolating procedures may be needed. An intensity offset, which can also be found from the Fourier transform, can be used for normalizing the intensity data. The frequency analyzer 24 can also measure intensity variations among the differing measuring beam frequencies.

The iterative procedure for applying the merit function of Equation (12) can also be conducted in two stages. The first stage of iteration finds a local maximum in the form of one of the localized correlation peaks within the main lobe or envelope 70. A non-linear fitting algorithm, such as Brent's method, which approximates the data with a parabola, can be used to hasten convergence to one of the local maxima. The second stage of iteration finds the global maximum, which can be limited to a choice among the localized correlation peaks sharing the same phase offset. A similar non-linear fitting algorithm can be used to hasten convergence to the global maximum evaluating the correlation function at integer multiples of one-half of the nominal measuring beam wavelength. The final convergence of the merit function at the juncture of the highest localized peak 72 with the generalized peak 68 of the main lobe or envelope 70 allows for the measurement of pixel distances D to accuracies equivalent to (or at least approaching) those associated with conventional phase-shifting interferometry over measurement ranges corresponding to absolute distances of individual pixels from the reference surface 34, which is beyond even the range of conventional frequency-shifting interferometry that is subject to frequency aliasing.

The merit function of Equation (12) automatically unwraps the phase measures of individual pixels (i.e., resolves the modulo $2\pi$ ambiguity of phase) by using the phase measure to better distinguish among the sinusoid frequencies corresponding to the distances D'. However, the sinusoidal phase and frequency information can be acquired or combined in separate steps. For example, a Fourier transform applied to the intensity data sets returns not only the amplitude contribution of sampled sinusoid frequencies, but also their phase offset. The sampled frequencies corresponding to test distances D' in the vicinity of the distance D can be expected to reference the same phase offset. Interpolation among the highest amplitude frequency samples can produce a separate measure of the distance D corresponding to the peak sinusoid frequency.

Automatic phase unwrapping can be accomplished by using the phase offset at the nominal beam frequency to limit the choices among the distances D' to those at an integer multiple of one-half of the nominal measuring beam wavelength. The distance D' closest to the highest amplitude frequency is considered as the measure of the distance D. Alternatively, conventional phase unwrapping can be used to find the relative height of each pixel by determining the relative phase offset for each pixel and using the measure of the distance D from the peak sinusoid frequency to resolve the number of $2\pi$ phase intervals between adjacent pixels. In fact, the merit function of Equation (12) can also be used in this way. Each pixel is assigned a phase offset as determined by the highest subpeaks. The distance D is found by interpolating among the highest subpeaks, but is not considered as the final measure. Instead, pixel-to-pixel variations in the distance D are used to resolve the remaining $2\pi$ phase ambiguities between the pixels.

A number of variables can affect the accuracy of the measurements, including the accuracy with which the measuring beam frequencies and their variations are known. Precise knowledge of the measuring beam frequencies supports a wider range of measurements including absolute measurements of the distance D.

The main lobe or envelope of the merit function of Equation (12) spans a range of test distances D' over which the longest distance undergoes one more complete cycle of phase change than the shortest distance. The localized correlation peaks (e.g., 72, 74, and 76) divide the main lobe or envelope 70 into incremental distances separated by one-half of the nominal measuring beam wavelength. To distinguish among the localized peaks within the main lobe or envelope 70, a phase shift $\Delta\phi$ over the range of measuring beam frequencies is preferably known to within the fraction of the one complete cycle of phase change that separates the localized peaks as follows:

$$\Delta\phi = \frac{\pi\lambda_o}{\text{Peak Width}} \quad (13)$$

where $\lambda_O$ is the nominal wavelength of the measuring beam.

Equivalent expressions can be written for the phase shift $\Delta\phi$ in terms of the total range of beam frequency variation $\Delta\upsilon_{TOTAL}$ over the nominal measuring beam frequency $\upsilon_O$ or the total range of beam wavelength variation $\Delta\lambda_{TOTAL}$ over the nominal wavelength $\lambda_O$ as follows:

$$\Delta\phi = \frac{2\pi\Delta\nu_{TOTAL}}{\nu_o} = \frac{2\pi\Delta\lambda_{TOTAL}}{\lambda_o} \quad (14)$$

From these expressions it can be gathered that increasing the measuring beam frequency bandwidth widens the tolerance for distinguishing phase shifts by reducing the number of localized correlation peaks within the main correlation lobe 70. The localized correlation peaks (e.g., 72, 74, and 76) are still spaced by one-half of the nominal measuring beam wavelength, but the main correlation lobe 70 narrows with increasing bandwidth.

The phase shift $\Delta\phi$ is related to an uncertainty in the measuring beam frequency as follows:

$$\Delta\phi = \frac{4\pi D \Delta\nu_{UNC}}{c} \quad (15)$$

where $\Delta\upsilon_{UNC}$ is the uncertainty or tolerance range for the measuring beam frequency.

Combining Equations (14) and (15), an expression for a preferred limit of measuring beam uncertainty can be written as the following inequality:

$$\Delta\nu_{UNC} < \frac{c\Delta\nu_{TOTAL}}{2D\nu_o} \quad (16)$$

or equivalently:

$$\Delta\nu_{UNC} < \frac{c\Delta\lambda_{TOTAL}}{2D\lambda_o} \quad (17)$$

Working from the example set forth in Table 1, the measuring beam frequency uncertainty $\Delta\upsilon_{UNC}$ should be less than approximately 430 GHz. The measuring beam frequency $\Delta\upsilon_{UNC}$ that can be tolerated while distinguishing among the localized correlation peaks decreases as the distance D increases. Accordingly, the tolerance for measuring beam frequency uncertainty $\Delta\upsilon_{UNC}$ is preferably set at the largest distance D that is anticipated for taking measurements.

Errors in the assumption or determination of the nominal measuring beam frequency $\upsilon_O$ can affect the locations of the localized peaks within the main correlation lobe 70. The highest localized peak can be offset from the generalized peak 68 of the main lobe 70 by up to one-half of the distance between the localized peaks. Along the beam frequency domain (i.e., the abscissa of the graph in FIG. 2), a span of frequencies equal to c/2D is associated with each complete $2\pi$ cycle of phase change for a given distance D. The localized peak offset is related to the fractional portion of the frequency span of c/2D taken up by the nominal measuring beam frequency error.

In the example of Table 1, the distance D is 28 microns, so the span of measuring beam frequencies covering one complete cycle of interference is equal to approximately 5360 GHz. The largest offset of the localized peaks would be caused by a nominal measuring beam frequency error of approximately 2680 GHz, where the highest localized peaks would straddle the generalized peak 68 of the correlation function by distances equal to one-fourth of the considered nominal measuring beam wavelength. The highest localized peaks identified at a nominal measuring beam frequency error at a multiple of the 5360 GHz spacing for distances D of 28 microns remain aligned with the generalized peak 68 of the correlation function. However, at other distances D at which other pixels may be located, a different frequency spacing is expected for which the nominal measuring beam frequency error would not be an exact multiple.

For maintaining a desired accuracy, a number of different approaches can be used. The most direct approach is to determine the nominal measuring beam wavelength with sufficient accuracy so that the highest localized peak matches the generalized peak 68 of the correlation function to the desired accuracy throughout the measurement range. The frequency of the measuring beam can be measured for this purpose; or assuming that the incremental changes in measuring beam frequency are known, different values for the nominal beam frequency can be tested by the merit function to identify the nominal beam frequency at which the highest localized peak correlations are found for a plurality of pixels at different distances D. The correlations among pixels of different distances D can also be evaluated for determining a nominal measuring beam frequency error. Alternatively, curve fitting or other interpolating techniques can be applied to the highest localized peaks to approximate the generalized peak 68 of the main correlation lobe 70.

Ordinarily, it is more important to know the difference in height among the pixels than the absolute distance D of each pixel from its counterpart on the reference surface 34. Systematic errors in the measurement of the absolute distances D can be ignored or otherwise accommodated if the pixel-to-pixel error variation is small. Distance errors cause by errors in the nominal beam frequency are generally limited to less than +/− one-quarter of the considered nominal beam wavelength and vary from each other within this limit as a function of the height variation among the pixels to the overall distance of the measurement. An ambiguity problem can arise from a choice between localized peaks that straddle the generalized peak 68 by approximately equal one-quarter wavelength amounts. Preferably, the nominal beam frequency error is limited to one-third of the frequency span of c/2D to avoid any ambiguity in the identification of the highest localized peak of the correlation function.

Determining distance D from a normalized correlation, such as the merit function of Equation (12) is highly dependent on sampling procedures for selecting test distances D'. For example, finding localized correlation peaks by sampling on a grid of equally spaced test distances D' can be problematic because of aliasing. The following procedure mitigates this difficulty:
1. Locate the main lobe 70 of the normalized correlation function.
2. Find the location of a localized correlation peak (e.g., 72, 74, or 76) within the main lobe 70 by using a maximization routine.
3. Sample the normalized correlation at other localized correlation peaks separated from the localized peak found in step 2 by half-wavelength intervals.
4. Find the location of the generalized peak 68 of the main lobe 70 either from the highest localized peak itself or from a combination of the localized peaks. For example, fitting a curve to the localized peaks can assist finding the generalized peak 68.

The ambiguity interval, which limits the range of distance variation within which the distances D can be uniquely resolved, results from issues of aliasing in which a pixel intensity pattern (i.e., pixel data set) matches more than one frequency of sinusoid. For measurements taken at equal increments of measuring beam frequency, the ambiguity interval is given by Equation (1). The pixel intensity patterns associated with actual distances D that exceed the ambiguity interval can be matched by the expected intensity patterns associated with more than one test distance D'. At shorter distances D, i.e., distances within the ambiguity interval, or at longer distances D known to be within a particular ambiguity interval, the intensity patterns can be uniquely matched at one test distance D'. However, at longer distances D that are not known to be within a particular ambiguity interval, the intensity patterns can be matched at more than one test distance D', leading to uncertainty in the true measure of the distance D.

As apparent from Equation (1), the ambiguity interval can be enlarged to encompass the intended range of measurement by reducing the size of the beam frequency increment. However, as apparent from Equation (2), the accuracy of the measurement decreases with a decrease in the beam frequency increment unless the number N of beam frequency increments correspondingly increases. Increasing the number N of beam frequency increments is discouraged because of attendant increases in processing time. In accordance with the invention, the pixel intensity patterns can be created at unequal spacing between beam frequencies to expand the ambiguity interval while achieving the desired accuracy of measurement. Overall, such uneven beam frequency variations are regarded as chirping.

For example, over an intended range of beam frequency variation, the beam frequencies can be finely spaced within groups limited to opposite ends of the range, and the groups can be spaced apart by a much larger amount. One preferred approach produces a succession of beam frequencies that are spaced by an equal amount though a first portion of the range of beam frequencies, are entirely absent through a second portion of the range of beam frequencies, and are spaced by another equal amount through a third range of measuring beam frequencies. The frequencies clustered at opposite ends of the beam frequency range can be produced by tuning a single laser through the entire beam frequency range, or a separate laser can be used for tuning within each of the first and third portions of the beam frequency range.

Separate Fourier transforms can be applied to the pixel intensity data gathered within the first and third portions of the range of beam frequencies to provide two measures of phase offset and sinusoid frequency at different nominal beam frequencies. Similar phase offset measures can be obtained by applying a multi-sample phase-shifting algorithm to the pixel intensity data. A twelve-sample algorithm is preferred. The change in phase offset between the first and third portions of the range as a result of the change in nominal beam frequency between the first and third ranges can provide an accurate measure of the distance D over an enlarged ambiguity interval. The accuracy is improved by the overall spacing between the first and third portions of the range of beam frequencies, and the ambiguity interval is expanded by the more limited spacing of the beam frequencies within the first and third portions of the ambiguity interval.

In general, the ambiguity interval is expanded by reducing the number of different frequency sinusoids that are capable of fitting the pixel intensity data sets. More finely spacing the beam frequencies is one way to reduce the number of sinusoids within a given measuring range. Another way is to unevenly space the measuring beam frequencies. Larger beam frequency spacing can be accommodated with the first and third portions of the beam frequency range if the spacing within the first and third portions differ from one another. The sinusoid frequencies capable of matching the intensity pattern produced for a given distance D at one beam frequency spacing differ from the sinusoid frequencies capable of matching the intensity pattern produced for the same distance D at a different frequency spacing. However, among the sinusoid frequencies matching one or the other of the differently spaced intensity patterns, the sinusoid frequency corresponding to the distance D matches both intensity patterns.

The spacing between beam frequencies can be varied geometrically, e.g. logarithmically, or in a variety of other ways including variations that result in spacing that increases and decreases throughout the beam frequency range. Generalized Fourier transforms can be used for resolving phase and frequency information from sinusoidal matches to the pixel intensity patterns. The sine or cosine transforms of Equations (10) and (11) can also be used to resolve sinusoidal phase and frequency information within a correlation function based on either regular or irregular beam frequency spacing, since the beam frequencies $v_n$ at which the intensities $l_n$ are gathered (rather than any assumed spacing) are input into the equations.

The interference patterns produced by some interferometers are affected by multiple reflections between test and reference surfaces. For example, in common path interferometers, such as Fizeau interferometer, the test and reference surfaces 80 and 82 can form an optical cavity 90 as shown in FIG. 6. An incident beam 84 is split into transmitted components 86 and reflected components 88, each of which is subject to multiple reflections. Accordingly, the light that contributes to the formation of an interference pattern is composed of multiple reflections. As a result, the fringe/speckle patterns can deviate from the cosine form that results from single-reflection interferometry.

As an example, a Fizeau interferometer can be considered for which the reflection coefficients for both surfaces are given by R. The interference fringes then have the form:

$$I'_n = 1 - \frac{1}{1 + F\sin^2\left(\frac{2\pi}{c}Dv_n\right)}, \quad (18)$$

where

-continued $$F = \frac{4R}{(1-R)^2}. \qquad (19)$$

For such fringes, the procedure for measuring the distance D includes identifying a starting distance D' as in Step 1 above, and then, instead of determining D by finding the sinusoid of Equation (7) that maximizes the normalized correlation with a pixel data set as set forth in Equation (12), the value of D' that causes the maximum normalized correlation between Equation (18) and the pixel dataset is determined in accordance with the more generalized form of the normalized correlation function as follows:

$$E(D') = \frac{\sum_{n=1}^{N} I_n I'_n}{\sqrt{\sum_{n=1}^{N} I_n^2} \sqrt{\sum_{n=1}^{N} I'^2_n}}$$

At a conjunction of the highest localized peak 72 optimizing phase offset with the generalized peak 68 of the correlation lobe 70 and ideally corresponding to a normalized correlation of one, the distance D can be absolutely measured to a fine division of the one-half wavelength distances that separate the localized correlation peaks. The accuracy is limited largely by system noise and other influences in common with phase-shifting interferometers as well as by the uncertainty of the measuring beam frequencies.

Although the localized correlation peaks are preferably used to inform the identification of a generalized peak or the highest among the localized peaks for determining the value of distance D, the identification of one and preferably the highest of the localized peaks can be used to identify a phase offset of the nominal beam frequency for making relative height comparisons among the pixels or for other purposes including those associated with conventional phase-shifting interferometry.

The invention is primarily directed to the measurement of surfaces but can also be applied to other interferometric applications, including those involving temporal offset measurements between measuring beams. For example, measurements of physical distance and refractive index can be made. Tuning a single laser source, multiple laser sources, or a combination of the two can produce the multiple measuring beam frequencies. The number of measuring beam frequencies and their spacing can be adjusted to the requirements of different applications including the overall distance of measurement and the range of the distance measurement.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method of measuring height variations of a test surface comprising steps of:
    forming a plurality of interference patterns between interfering portions of a measuring beam comparing the test surface against a reference surface at different measuring beam frequencies;
    arranging interference data from among the plurality of interference patterns in sets corresponding to individual points on the test surface;
    evaluating the interference data within the individual sets as both a phase offset and a frequency of a periodic function that periodically varies in amplitude as a function of the measuring beam frequency; and
    combining the phase offset and frequency of the periodic function into a measure of the height variation among the individual points on the test surface.

2. The method of claim 1 in which the phase offset corresponds to a modulo $2\pi$ angular difference between the interfering beam portions from individual points on the test surface considered at a nominal measuring beam frequency.

3. The method of claim 2 in which the step of evaluating includes resolving the frequency of the periodic function to an accuracy that is within a single $2\pi$ cycle of the periodic function over the range of measuring beam frequencies.

4. The method of claim 3 in which the step of combining includes unwrapping the phase offset of the periodic function for the individual points on the test surface as surface height variations having regard to the frequency of the periodic function for measuring surface height variations associated with angular differences between the interfering beam portions exceeding $2\pi$.

5. The method of claim 1 in which the phase offset of the periodic function supports measures of the test surface height variations within a first ambiguity interval corresponding to a $2\pi$ angular difference between the interfering beam portions considered at a nominal measuring beam frequency.

6. The method of claim 5 in which the frequency of the periodic function supports measures of the test surface height variations within a second ambiguity interval corresponding to a multiple of the $2\pi$ angular difference between the interfering beam portions considered at the nominal measuring beam frequency.

7. The method of claim 6 in which the surface height variations are resolved from the measures of phase offset to an accuracy that is within a division of the first ambiguity interval and over a range extending throughout the second ambiguity interval.

8. The method of claim 1 in which the periodic function varies in phase offset and frequency as a function of optical path length differences between the interfering portions of the measuring beam.

9. The method of claim 8 in which the step of evaluating includes identifying one or more optical path length differences at which a correlation of the periodic function to the interference data within the individual sets approaches a localized peak associated with the phase offset of the periodic function.

10. The method of claim 9 in which the step of evaluating includes identifying one or more optical path length differences at which the correlation of the periodic function to the interference data within the individual sets approaches a generalized peak associated with the frequency of the periodic function.

11. The method of claim 10 in which the step of combining includes identifying the localized peak closest to the generalized peak for measuring the height variations among the individual points on the test surface.

12. The method of claim 1 in which the interference data gathered in sets from the interference patterns varies as a result of changes in the measuring beam frequency through cycles of constructive and destructive interference, and each complete cycle of constructive and destructive interference spans an interval of beam frequencies equal to the speed of light divided by an optical path length difference traversed by the different portions of the measuring beam.

13. The method of claim 12 including a step of determining the measuring beam frequencies to within a range of uncertainty set by the following expression:

$$\Delta v_{unc} = \frac{c \Delta v_{total}}{OPDv}$$

where "c" is the speed of light, "$\Delta v_{TOTAL}$" is equal to the range of measuring beam frequencies, "OPD" is the optical path length difference between the test and measuring beams, and "$v$" is the measuring beam frequency subject to the uncertainty.

14. The method of claim 1 in which the step of forming the plurality of interference patterns between interfering portions of a measuring beam includes comparing the test surface against a reference surface at unevenly spaced measuring beam frequencies.

15. A method of measuring height variations of a test surface comprising steps of:
  forming a plurality of interference patterns comparing the test surface against a reference surface at different measuring beam frequencies;
  arranging interference data in sets of corresponding points among the plurality of interference patterns;
  identifying patterns of phase change within the sets of corresponding points, the patterns exhibiting both (a) a phase offset referenced to a nominal measuring beam frequency as a first measure of surface height variations between points on the test surface within a first ambiguity interval and (b) a change of phase as a linear function of a change in the measuring beam frequency as a second measure of surface height variation between points on the test surface within a second ambiguity interval; and
  resolving the change of phase with respect to the change in measuring beam frequency having regard to the phase offset for distinguishing height variations between points on the test surface within the second ambiguity interval to an accuracy that is within the first ambiguity interval.

16. The method of claim 15 in which the step of resolving includes a step of comparing the identified patterns of phase change to predicted patterns of phase change based on assumed height variations over a corresponding range of measuring beam frequencies.

17. The method of claim 16 in which the measuring beam frequencies span a range of beam frequencies, and the test and reference surfaces are separated through an average distance such that average points on the test surface undergo more cycles of phase change over the range of beam frequencies than the number of interference patterns that are formed by the different beam frequencies.

18. The method of claim 15 in which the step of forming a plurality of interference patterns includes comparing the test surface against a reference surface at unevenly spaced measuring beam frequencies.

19. A method of comparing surface features of a test surface to a reference surface to a sub-measuring beam wavelength accuracy over a multiple measuring beam wavelength range comprising the steps of:
  producing at least three interference patterns that characterize optical path differences between the test and reference surfaces at different measuring beam frequencies;
  acquiring interference values for sets of corresponding points within the at least three interference patterns;
  fitting the interference values from individual sets of corresponding points to a periodic function that relates changes in the interference values to the changes in the measuring beam frequency;
  evaluating the periodic function as a relative phase offset between different sets of corresponding points in the interference patterns for measuring the surface features to an accuracy less than one-half of an average wavelength of the measuring beams within a first limited ambiguity interval; and
  evaluating the periodic function as a change of phase with respect to a change of the measuring beam frequency for measuring the surface features to an accuracy of less than the first limited ambiguity interval through a second enlarged ambiguity interval equal to a multiple of the average wavelength of the measuring beams.

20. The method of claim 19 in which the periodic function relates changes in the interference values within the individual sets to predicted changes in the interference values based on the changes in the measuring beam frequencies at which the interference values were formed.

21. The method of claim 19 in which the step of evaluating the periodic function as the change of phase with respect to the change of measuring beam frequency identifies distances between the test and reference surfaces for the individual sets of corresponding points.

22. The method of claim 19 in which the step of evaluating the function as the change of phase with respect to the change of measuring beam frequency includes comparing the interference values of individual sets of corresponding points to the predicted patterns of phase change for identifying the given measurements that exhibit patterns of closest correlation with the interference values.

23. The method of claim 22 in which given measurements in the vicinity of the closest correlation exhibit correlation values that vary in a sinusoidal manner approaching the closest correlation.

24. A method of measuring surface features of a test surface in comparison to a reference surface comprising the steps of:
  positioning the test and reference surfaces at a fixed relative position with respect to each other;
  illuminating the test and reference surfaces with a measuring beam at a plurality of different measuring beam frequencies at the same fixed relative position with respect to each other for producing a succession of interference patterns that encode differences between the test and reference surfaces;
  considering interference data from the succession of interference patterns in sets corresponding to individual points on the test surface; and testing the sets of interference data against predictable patterns of interference corresponding to different distances between corresponding points on the test and reference surfaces.

25. The method of claim 24 in which the step of testing includes testing the sets of interference data against the predictable patterns of interference identify phase offsets between interfering portions of the measuring beam.

26. The method of claim 25 in which the phase offsets provide a measure of the distance between the corresponding points on the test and reference surfaces having an ambiguity interval based on the measuring beam frequency at which the phase offsets are measured.

27. The method of claim 26 in which the predictable patterns of interference relate changes of phase to changes of measuring beam frequency as measures of distance between the corresponding points on the test and reference surfaces.

28. The method of claim 24 in which the step of testing includes testing each distance between corresponding points on the test and reference surfaces on the basis of both a phase offset and a change of phase with respect to a change of measuring beam frequency.

29. A method of measuring surface features of a test surface in comparison to a reference surface comprising the steps of:
illuminating the test and reference surfaces with different portions of a measuring beam having a first beam frequency for producing an interference pattern that encodes differences between the test and reference surfaces as a pattern of intensity variation;
successively shifting the measuring beam frequency for producing a plurality of additional interference patterns that encode the same differences between the test and reference surfaces as different patterns of intensity variation;
gathering intensity information from the interference patterns in sets corresponding to multiple measures of individual points on the test surface;
relating the intensity information within the sets to phase information that varies sinusoidally as a function of progressive changes in the measuring beam frequency;
evaluating phase offsets for the sets of related phase information as a basis for making height comparisons between the individual points on the test surface within a limited ambiguity interval;
evaluating changes of phase with respect to changes of measuring beam frequency for the sets of related phase information as a basis for making height comparisons between the individual points on the test surface within an enlarged ambiguity interval; and
combining the height comparisons based on the phase offsets with the height comparisons based on the changes of phase to produce height comparisons between the individual points on the test surface to an accuracy based on the height comparisons between the phase offsets over a range based on the height comparisons between the changes of phase.

30. The method of claim 29 in which the step of evaluating the phase offsets includes scaling the phase offsets as fractional portions of a measuring beam wavelength.

31. The method of claim 30 in which the step of evaluating the changes in phase includes scaling the changes in phase as a linear function of the changes of measuring beam frequency to absolute distances between corresponding points on the test and reference surfaces.

32. The method of claim 29 in which the step of relating includes a step of matching the intensity information with phase information that varies sinusoidally with both changes in measuring beam frequency and changes in distance between corresponding points on the test and reference surfaces.

33. The method of claim 32 in which the step of matching compares the intensity information within the sets to the sinusoidal variations in intensity that accompany changes in measuring beam frequency at a plurality of different test distances.

34. The method of claim 33 in which the step of comparing involves a correlation function for resolving the height variations within the enlarged ambiguity interval to an accuracy within the limited ambiguity interval.

35. A method of measuring optical path length differences between interfering portions of a measuring beam comprising steps of:
gathering intensity-related data from a plurality of interference measurements taken at different frequencies of the measuring beam;
comparing the intensity-related data to a periodic function that varies in phase offset and frequency of phase change as a function of optical path length differences between the interfering portions of the measuring beam;
identifying one or more optical path length differences at which a correlation of the periodic function to the intensity-related data undergoes a localized peak that matches a phase offset predicted by the periodic function to a pattern of the intensity-related data; and
further identifying an optical path length difference at which the correlation of the periodic function to the intensity-related data undergoes a generalized peak that matches a frequency of phase change predicted by the periodic function to the pattern of the intensity-related data.

36. The method of claim 35 including a step of determining frequency changes between different frequencies at which the measuring beam is varied.

37. The method of claim 36 in which the step of comparing includes comparing the intensity data to values of the periodic function predicted for the determined changes in the measuring beam frequencies at test optical path length differences.

38. The method of claim 36 in which the step of determining includes determining the changes between the measuring beam frequencies to an accuracy at which relative phases predicted from the periodic function match the actual phases of the intensity data to an accuracy that is within the optical path length differences separating the localized peaks.

39. The method of claim 35 in which the step of determining includes determining the changes in the measuring beam frequencies to an accuracy such that a beam frequency uncertainty $\Delta v_{unc}$ is given by the following inequality:

$$\Delta v_{unc} < \frac{c \Delta v_{total}}{2Dv}$$

where "c" is the speed of light, $\Delta \upsilon_{TOTAL}$ is the total range of the measuring beam frequencies, "D" is one half of the optical path length difference between the different portions of the measuring beam, and "$\upsilon$" is a nominal measuring beam frequency.

40. The method of claim 35 including a step of determining absolute frequencies of the measuring beam to an accuracy at which the localized peak closest to a center of the generalized peak remains within and optical path length difference of less than one half of the nominal wavelength of the measuring beam.

41. The method of claim 35 in which the step of further identifying the optical path length difference at which the correlation of the periodic function to the intensity-related data undergoes a generalized peak includes identifying the optical path difference based upon the localized peaks.

42. The method of claim 41 in which the step of further identifying the optical path length difference includes identifying a highest among the localized peaks.

* * * * *